R. LIEBAU.
AIR SPRING SUSPENSION.
APPLICATION FILED FEB. 26, 1919.
1,395,438.
Patented Nov. 1, 1921.
2 SHEETS—SHEET 2.
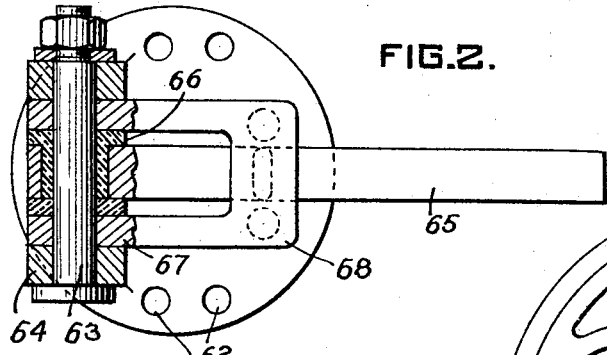
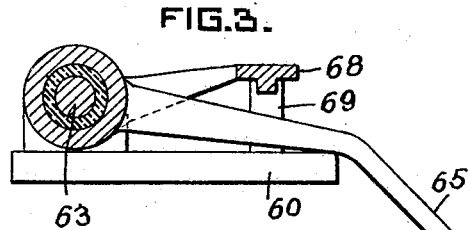
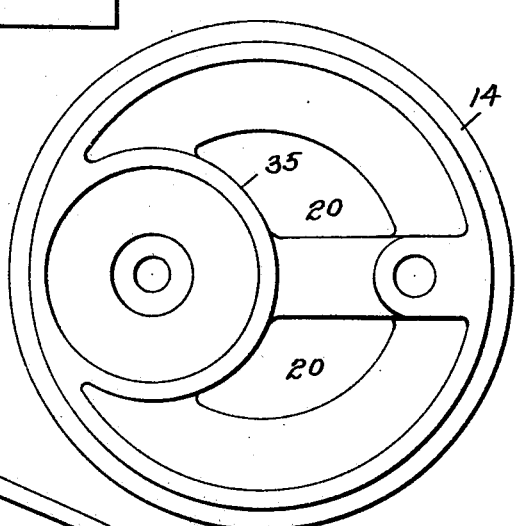
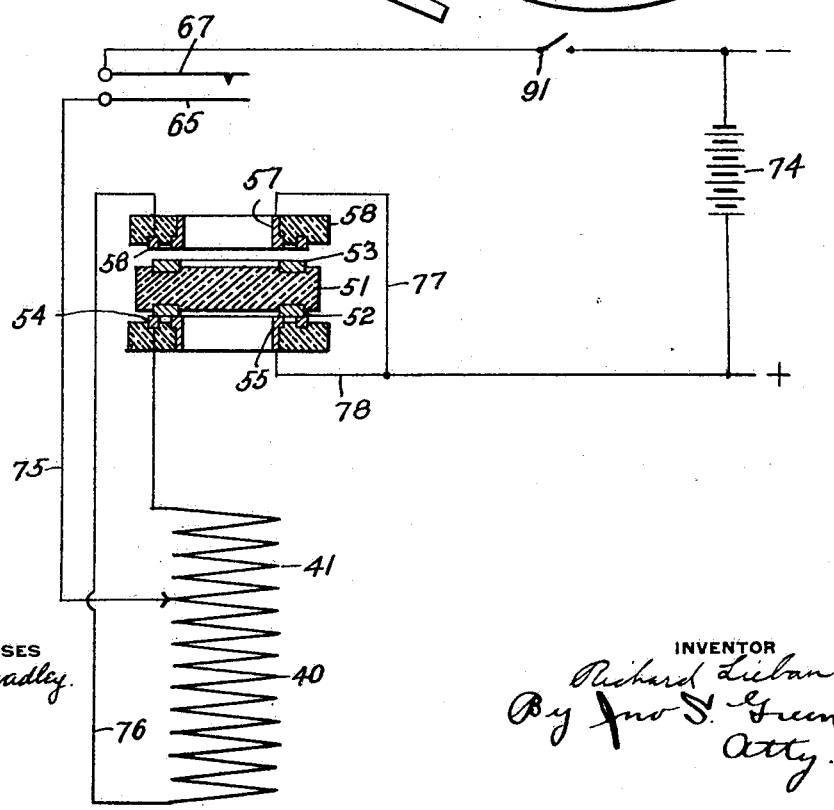

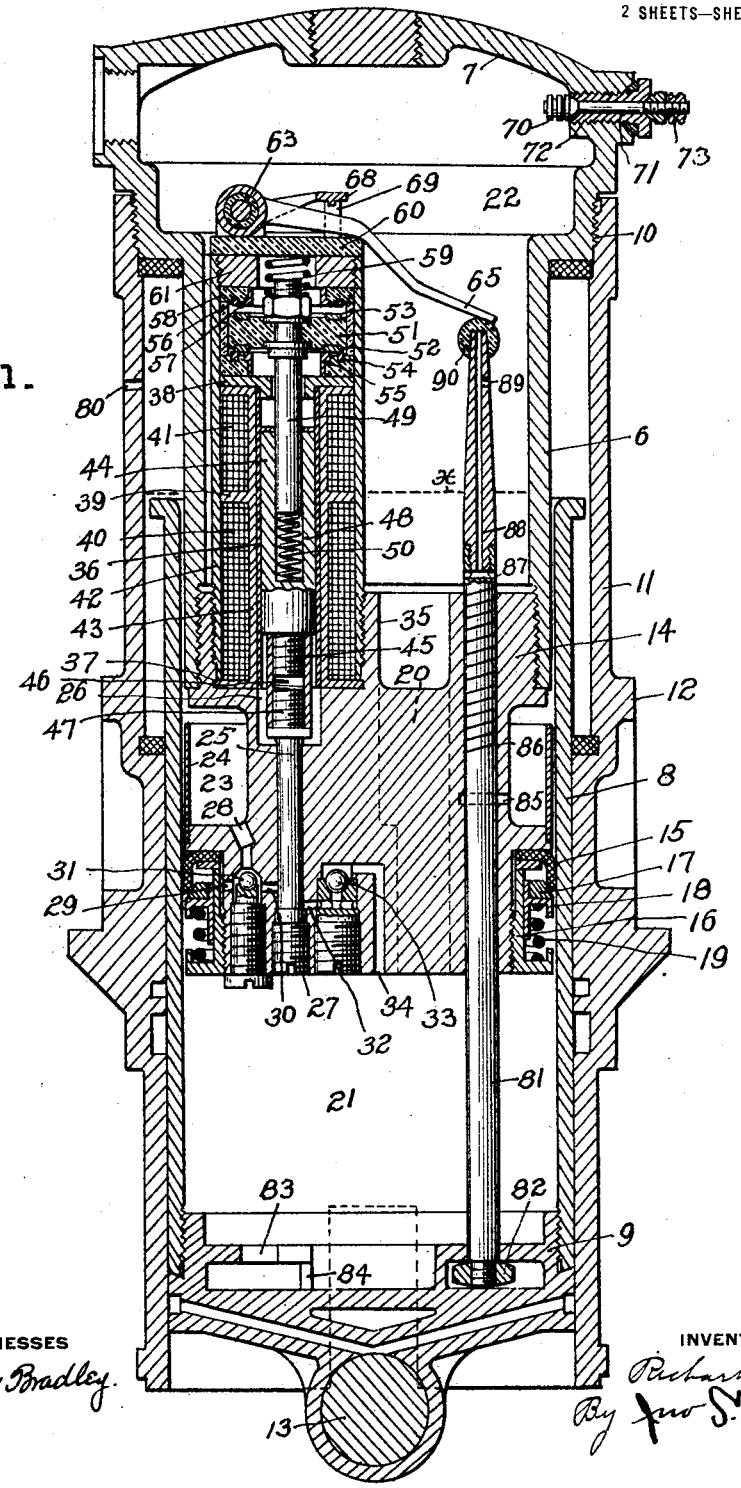

UNITED STATES PATENT OFFICE.

RICHARD LIEBAU, OF NEW HAVEN CONNECTICUT, ASSIGNOR TO THE WESTINGHOUSE AIR SPRING COMPANY, A CORPORATION OF PENNSYLVANIA.

AIR-SPRING SUSPENSION.

1,395,438.   Specification of Letters Patent.   Patented Nov. 1, 1921.

Application filed February 26, 1919. Serial No. 279,435.

*To all whom it may concern:*

Be it known that I, RICHARD LIEBAU, a citizen of the United States, and a resident of New Haven, in the county of New Haven and State of Connecticut, have made a new and useful Invention in Air-Spring Suspension, of which the following is a specification.

This invention relates to air springs of the type set forth in Letters Patent No. 1,036,043 issued to George Westinghouse on August 20, 1912.

In the present application as in said patent the invention is embodied in a fluid compression device adapted for use as a compression spring broadly applicable where two bodies are so associated that resilient support of one is desirable and the general object in this as in said patent is to embody the principle of resilient support by an elastic medium such as air in a commercially practical self-contained compression device adapted to serve all the purposes and functions of a spring.

This invention also resembles that of said patent in so far as a fluid tight joint between the sliding surfaces of the device is maintained by means of an oil bath. In said patent a pump contained within the device is used for transferring the oil which leaks past the sliding joint back to the interior of the device and in said patent the pump is only operated upon the compression and extension movements of the device.

An object of this invention is to provide an air spring having a pump for returning the liquid and also for charging the spring with air which will act automatically whenever the necessity arises.

A still further object is to provide in an air spring a pump which will automatically charge the spring with air whenever the spring collapses below a determined point and this whether the vehicle upon which the spring is installed is in operation or not.

These, as well as other objects, I attain in the device described in the specification and illustrated in the drawings accompanying and forming a part of this application.

In the drawings Figure 1 is a sectional elevation of a device embodying this invention; Fig. 2 is a partial plan and partial sectional view of a portion of said device; Fig. 3 is a view partially in section and partially in elevation of the elements shown in Fig. 3; Fig. 4 is a top plan view of the plunger head used in the device and Fig. 5 is a view diagrammatically illustrating the switch and wiring of the device for operating the charging pump.

In the device the cushion or compression chamber is made up of a cylinder 6 provided with a head 7 formed integrally therewith and which telescopes within a cylinder 8 having a bottom 9 threaded thereinto, secured to head 7 at 10 is an outer cylinder 11 which serves as a cover or mud guard and a guide for cylinder 8. Guard 11 is provided with a face 12 which is adapted to be bolted to a bracket secured to the frame of the vehicle and cylinder bottom 9 by means of a pin 13 is adapted to be secured to one end of the steel spring of the vehicle adjacent to the cylinder bottom.

The air springs are arranged so that they will operate in series with the steel springs of the vehicle as is now common in air springs of the Westinghouse type.

Threaded to the lower end of cylinder 6 is a plunger head 14 and this plunger head carries a cup leather packing 15 for the sliding joint between cylinders 6 and 8.

The packing is held in place by means of a nut and is caused to make a tight joint with cylinder 8 by means of a cone expander 17, a follower 18 and coil spring 19 as shown in Fig. 1.

Two passages 20 extend through the plunger head from top to bottom and permit passage of the fluid contained in the spring from chamber 21 below the plunger head to chamber 22 above the same.

The plunger head is grooved to form a collecting chamber 23 which extends around the head and a sheet metal ring 24 surrounds chamber 23 for the purpose of retaining within the chamber any oil which leaks past cup leather packing 15.

The plunger head is drilled through from top to bottom to provide a cylinder for a pump plunger 25 and this bore is enlarged at 26.

A screw plug 27 is threaded into the bottom of the bore and its upper end serves as an abutment for the pump plunger when reaching the limit of its down stroke. A channel 28 leads from collecting chamber 23 to a valve chamber 29 and a channel 30 connects the valve chamber with the pump cylinder. A ball check 31 located in valve chamber 29 prevents the return of fluid to collecting chamber 23 upon down strokes of pump plunger 25. Outlet 32 of the pump cylinder is provided with a ball check 33 and the fluid forced by the pump plunger past check valve 33 enters chamber 21 of the air spring by way of passage 34.

The plunger head is provided with an upstanding flange 35 arranged concentrically with relation to the pump plunger and this flange is adapted to support the pump operating mechanism.

A cast iron cylinder 36 having a bore of the same diameter as bore 26 of the plunger head is provided with a bottom flange 37 which rests on the top of the plunger head within flange 35. The cylinder is provided with the top flange 38 and an intermediate flange 39 located about one-third of the distance from the top.

A coil 40 surrounds cylinder 36 between flanges 39 and 37 and with the iron cylinder forms an electromagnet. Another coil 41 surrounds cylinder 36 between flanges 39 and 38 and with the cylinder 36 forms another electromagnet. A brass cylinder 42 surrounds the coils 40 and 41 and is threaded into flange 35. A brass liner 43 is provided for the interior of cylinder 36 and forms a bearing surface for a movable core 44.

The lower end of the core at 45 is reduced in cross-section and is threaded to receive an interiorly threaded brass nipple 46 into the lower end of which the upper end of the pump plunger is screwed.

The major portion of core 44 is formed with a central bore 48 and within this a rod 49 is fitted to slide. A coil spring 50 is located between the inner end of bore 48 and the inner end of rod 49.

The upper end of rod 49 carries a circular disk 57 which carries a portion of the switch device for controlling the operation of coils 40 and 41. Disk 57 is preferably made of some insulating material such as bakelite and into the lower face of this disk a copper ring 52 is secured while into the upper face thereof a copper ring 53 is secured. These rings may be molded into the insulating material in the course of manufacture as is now common. Ring 52 serves to make and break contact between a ring 54 and a ring 55 included in the circuit within which coil 41 is located, so that coil 41 will be energized when ring 52 closes its circuit and when this occurs core 44 will be lifted and with it pump plunger 25. The upward movement of core 44 will compress spring 48 and in so doing rod 49 together with disk 51 will be lifted so that ring 53 will be brought in contact with two concentric copper rings 56 and 57 contained in an insulating base 58.

Rings 56 and 57 are included in the circuit of coil 40 and when they are connected by means of ring 53 coil 40 will be energized and the pump plunger by means of core 44 will be moved to the bottom of its cylinder. A coil spring 59 located between the upper end of rod 49 and cover plate 60 for cylinder 42 tends to hold rod 49 in its lowermost position. Cover 60 is formed of insulating material and is secured to a metal ring 61 threaded into the upper part of cylinder 42 by means of screws 62.

A short shaft 63 is journaled in bearings 64 secured to insulating plate 60 and on this a lever 65 is mounted by means of an interposed insulating bushing 66. A second lever having two arms 67 and a cross arm 68 is mounted on shaft 63 so as to straddle lever 65. This lever 67 is provided with depending pins 69 which rest upon the top of insulating plate 60 and normally hold the cross piece 68 of said lever 67 above and out of contact with lever 65.

Lever 67 is electrically connected by means of wiring not shown to the inner end 70 of terminal 71 which extends through an insulating plug 72 screwed into the head 7 of the air spring. The outer end 73 of the terminal is connected up to one side of a source of supply such as a storage battery 74.

Lever 65 as shown in the diagram, Fig. 5, by means of wiring 75 connects with the lower end of coil 41 and the upper end of coil 40. The lower end of coil 40 by means of wiring 76 connects with outer ring 56 while inner ring 57 by means of wiring 77 connects with the ground or the other end of the source of supply 74. The upper end of coil 41 connects with outer ring 54 and inner ring 55 by means of wiring 78 connects up to wiring 77 and therefore either to the ground or the source of supply of current.

Rings 54 and 55 with ring 52 form a switch for energizing coil 41 and rings 56 and 57 with ring 53 form a switch for energizing coil 40 or rather for placing these coils in circuit with the source of supply 74.

As the coils are alternately energized and deënergized as long as lever 65 is in contact with cross bar 68 of lever 67 the pump plunger 25 will be reciprocated and will pump first the oil contained in chamber 23 and then air into the interior of the air spring since chamber 23 because of the loose fit of cylinders 6 and 8 and air vent 80 through cylinder 11 is open to the atmosphere.

Plunger head 14 is bored through from top to bottom so as to form a bore for a rod 81 which is loosely held in position by means of a nut 82 which lies within an overhung groove 83 formed in cylinder bottom 9. The nut can be inserted sidewise into an opening 84 formed for that purpose in the side of the groove wall.

A duct 85 leads from collecting chamber 23 to the bore for rod 81 and surrounds said bore. The upper portion of rod 81 is provided with a spiral groove 86 which terminates about five-eighths of an inch above duct 85 when the air spring is in mid position as shown in Fig. 1.

The upper end of spiral groove 86 connects with a hole 87 drilled through rod 81. The upper end of rod 81 is drilled and tapped to receive the lower threaded end of a tubular extension 88. The interior of the tubular extension communicates with the hole 87 and therefore with the spiral groove. The tubular extension near its top is provided with a lateral duct 89 which extends through one wall to the interior of the extension. A ball tip 90 of insulating material is provided for the top of the tubular extension and at times is adapted to make contact with lever 65 to raise the same.

The interior of the spring will be charged with oil about to the level X.

A switch 91 is provided in the line between battery 74 and lever 67.

Let us assume that a motor vehicle such as an automobile, ambulance, truck, or the like is equipped with four springs such as this adapted to operate in series with the steel springs of the vehicle, let us assume that all four air springs are totally collapsed, by closing switch 91 which will close the circuits of all four springs the pumps in the different springs will be operated and the springs extended by the air pressure therein until they reach mid position or until the bottom of spiral groove 86 stands some litle distance above duct 85. When the air springs reach this position lever 65 will have moved out of contact with cross arm 68 of lever 67 and the air springs will cease operating.

The spiral groove 86 is not brought down farther than shown in the drawings as there will of necessity be some small leak around rod 81 to duct 85.

If it happened that the loads imposed on all four air springs of the vehicle were the same the pumps of the different springs would cease pumping at substantially the same time. If, however, as generally happens, different loads are imposed on the different springs the four springs will operate through different lengths of time in order to bring the four springs to mid position. For instance, one spring in order to support its load in mid position may require but 60 pounds of air pressure per square inch while another may require 70 pounds and the other two 100 and 120 pounds, respectively.

The pressure requisite to support the springs in the determined or mid position will be supplied by the pumps automatically. If without shifting the load the character of the road over which the vehicle is traveling collapses the springs sufficiently far to cause the pumps to operate the excess pressure will be bled away through the bleeder device. It will be seen that any excess movement of the springs which causes the pump to operate will likewise cause the bleeder to operate on the rebound movements.

If the load is removed from the vehicle the springs will extend and the bleeder will automatically lower the load platform of the vehicle until the springs again stand in mid position.

It will be readily seen that the springs will automatically adjust themselves to the load. Of course it will be understood that air springs of this type having the oil seal both for the sliding joint between cylinder 6 and 8 and the sliding joint between rod 81 and its bore will hold the air pressure for long periods of time, but the device of this invention causes the air springs to assume a determined adjustment irrespective of the load imposed on them and to automatically maintain such adjustment by varying the intensity of such air pressure to meet the load.

Having thus described my invention what I claim is—

1. In combination with an air spring having telescoping members forming a cushion chamber, a pump arranged to discharge air into said chamber and means the operation of which is independent of the relative movement of said means for operating said pump and a device within said air spring for controlling the operation of said means.

2. In an air spring, telescoping members forming a cushion chamber, a pump for forcing air into said chamber and electrically operated means for operating said pump.

3. In an air spring having telescoping members forming a cushion chamber, a pump located with the chamber for forcing air into said chamber and means operating independently of the relative movement of said members for operating said pump.

4. In an air spring, telescoping members forming a cushion chamber having a sliding joint adapted to be sealed with liquid and means operating automatically and independently of the relative movement of said members for returning leaked liquid from the low pressure side of said sliding joint to its high pressure side.

5. In an air spring, telescoping members forming a cushion chamber having a sliding joint adapted to be sealed with liquid, and an electrically operated pump for transferring leaked liquid from the low to the high pressure side of said joint.

6. In an air spring, telescoping members, an electrically operated pump within said members for forcing air into said spring, and means the operation of which is dependent upon the relative position of said members for controlling the operation of said pump.

7. In an air spring, telescoping members forming a chamber, a pump within said chamber arranged to pump oil and air, a magnetic device for operating said pump, and means controlled by the relative position of said members for controlling the operation of said magnetic device.

8. In an air spring, relatively movable members forming a cushion chamber, a pump for charging said chamber with air, and means operating independently of the load on said spring but dependent upon the relative position of said members for controlling the operation of said pump.

9. In an air spring, relatively movable members forming a cushion chamber, a pump for forcing air into said chamber, and automatic means for operating said pump while no relative movement between said members occurs and when such movement does occur.

In testimony whereof, I have hereunto subscribed my name this 2nd day of December, 1918.

RICHARD LIEBAU.